US008018689B2

(12) United States Patent
Lee

(10) Patent No.: US 8,018,689 B2
(45) Date of Patent: Sep. 13, 2011

(54) HARD DISK DRIVE WITH THERMAL DEFORMATION PREVENTION PLATE

(75) Inventor: Jae-Suk Lee, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1110 days.

(21) Appl. No.: 11/768,466

(22) Filed: Jun. 26, 2007

(65) Prior Publication Data

US 2008/0013217 A1   Jan. 17, 2008

(30) Foreign Application Priority Data

Jul. 10, 2006 (KR) .................. 10-2006-0064270

(51) Int. Cl.
G11B 33/14 (2006.01)
G11B 5/55 (2006.01)
G11B 21/08 (2006.01)
(52) U.S. Cl. .................. 360/267.7; 360/97.02
(58) Field of Classification Search ............... 360/264.7, 360/264.8, 97.02; 720/648
See application file for complete search history.

(56) References Cited

U.S. PATENT DOCUMENTS

| | | | | |
|---|---|---|---|---|
| 5,099,374 A | 3/1992 | Ohkita et al. | ............... | 360/256.6 |
| 5,963,398 A * | 10/1999 | Tohkairin | .................. | 360/264.7 |
| 6,011,670 A | 1/2000 | Balsley, Jr. et al. | ........ | 360/97.01 |
| 2002/0047339 A1 * | 4/2002 | Bernett et al. | .................. | 310/51 |
| 2003/0058582 A1 * | 3/2003 | Yanagihara | ................ | 360/264.8 |
| 2004/0042124 A1 * | 3/2004 | Wang et al. | ................ | 360/264.7 |
| 2004/0105190 A1 | 6/2004 | Kim et al. | .................. | 360/264.7 |
| 2005/0099734 A1 * | 5/2005 | Rafaelof | .................... | 360/264.8 |
| 2005/0174698 A1 * | 8/2005 | Matsuda et al. | ........... | 360/264.7 |
| 2006/0176609 A1 * | 8/2006 | Hayakawa et al. | ........ | 360/97.01 |
| 2007/0047130 A1 * | 3/2007 | Shigenaga et al. | ........... | 360/74.1 |
| 2007/0159716 A1 * | 7/2007 | Hanssen et al. | ............ | 360/97.01 |

FOREIGN PATENT DOCUMENTS

| | | |
|---|---|---|
| EP | 0690440 | 1/1996 |
| JP | 60-45982 | 3/1985 |
| JP | 64-023756 | 1/1989 |
| JP | 64-39668 | 2/1989 |
| JP | 2-287982 | 11/1990 |
| JP | 04-119572 | 4/1992 |

OTHER PUBLICATIONS

European Search Report issued Jul. 10, 2008 in EP Application No. 07111221.3.

* cited by examiner

*Primary Examiner* — Julie Anne Watko
(74) *Attorney, Agent, or Firm* — Stanzione & Kim, LLP

(57) ABSTRACT

A hard disk drive includes a voice coil motor yoke, a base to support the voice coil motor yoke, and formed of a material different from that of the voice coil motor yoke, and a thermal deformation prevention unit which is formed of a material that is substantially the same as that of the voice coil motor yoke, provided between the voice coil motor yoke and the base, and thereby preventing mechanical deformation due to different thermal expansion coefficients between the voice coil motor yoke and the base.

28 Claims, 3 Drawing Sheets

HARD DISK DRIVE WITH THERMAL DEFORMATION PREVENTION PLATE

CROSS-REFERENCE TO RELATED APPLICATIONS

This application claims the priority to Korean Patent Application No. 10-2006-0064270, filed on 10 Jul. 2006, the disclosure of which is incorporated herein by reference in its entirety.

BACKGROUND OF THE INVENTION

1. Field of the Invention

The present general inventive concept relates to a hard disk drive, and more particularly, to a hard disk drive which can prevent a defect such as a rapid off track phenomenon caused by different thermal expansions between a voice coil motor (VCM) and a base, being manufactured of different materials.

2. Description of the Related Art

Hard disk drives (HDDs) which record and reproduce data with respect to a disk using a read/write head are widely used as auxiliary memory devices in computer systems because of their fast access time to a large amount of data. With the recent increase in TPI (track per inch; a density in a direction along the rotation of a disk) and BPI (bits per inch; a density in a direction along the thickness of a disk), the HDD has achieved a significant increase in its capacity and its application field has expanded greatly. Accordingly, there has been an increasing demand for the development of compact HDDs which can be used for portable electronic products such as notebooks, personal digital assistants (PDAs), and mobile phones. Actually, a compact HDD having a diameter of 0.85 inches, which is similar to the size of a coin, has been recently developed and is expected to be used for mobile phones in the future.

The HDD includes a disk for recording data, a spindle motor for rotating the disk, a head stack assembly (HSA) having a read/write head to record and reproduce data with respect to the disk, a voice coil motor (VCM) for pivoting the HSA, and a base on which these elements are installed. The HSA pivots around a pivot shaft by the VCM and includes an actuator arm coupled to the pivot shaft capable of pivoting, a slider on which the read/write head is mounted, and a suspension installed on the actuator arm and supporting the slider to be elastically biased toward the surface of the disk. The slider is generally supported by the suspension while being attached to a flexure.

During a data recording and reproducing process, a lift force generated by the rotation of the disk and an elastic force caused by the suspension operate on the slider having the head. Accordingly, the slider maintains an elevated state above a data zone of the disk at a height at which the lift force and the elastic force are balanced. Therefore, the read/write head mounted on the slider records and reproduces data with respect to the disk while maintaining a predetermined displacement from the disk.

The HDD records and reproduces the data in response to a command from a host system. In the HDD, it is preferable that the data is accurately recorded along the center of a track. However, a typical read/write head may drift to the left and right along the center of the track due to the response characteristic of a tracking control circuit and bias applied to the read/write head. A degree of the deviation of the read/write head from the center of track, that is, off-track, can be detected by a servo burst signal recorded in a servo sector area. A signal indicating the size of the off-track is typically referred to a position error signal (PES).

When the off-track is considerable, the data recorded on neighboring tracks may be deleted by the recording for a target track. Although the reduction of the PES gradually becomes difficult according to the increase of TPI due to the high density of the HDD, a variety of methods are presently developed to reduce an off-track error.

Separately from the off-track phenomenon, a rapid off track (ROP) phenomenon may occur such that the read/write head following a track momentarily deviates from a current track due to an external effect. The ROP phenomenon rapidly drops the accuracy in a targeted track and may cause a defect to the HDD or reduce the reliability of the HDD.

The ROP phenomenon is presently believed to occur as a VCM yoke and the base are made of different materials which are known to exhibit a degree of different thermal expansion during a temperature change. In detail, the VCM yoke of the VCM and the HSA are directly coupled to the base. In general, the VCM yoke is made of a stainless steel and the base is made of aluminum. Thus, when a surface temperature increases during the operation of the HDD, the VCM yoke and the base exhibit different thermal expansion due to different thermal expansion coefficients. As the different thermal expansion becomes excessive, the ROP phenomenon occurs so that the read/write head momentarily deviates from the desired track.

When the HDD is driven by applying electric power, the surface temperature of the HDD increases as time passes so that parts of the HDD thermally expand. During the thermal expansion, deformation due to the different thermal expansion can be prevented to a certain degree by increasing the torque of a screw coupling the VCM yoke and base. However, when the thermal expansion is beyond the limit of the torque, deformations (such as from an earthquake) can cause the ROP phenomenon to occur, in which the read/write head momentarily deviates from the desired track.

To overcome the above problem, a method of fixing the VCM yoke to one side of the base only and allowing the other side to freely expand has been introduced. Nevertheless, this method has not sufficiently reduced the ROP phenomenon that is generated from the different thermal expansion caused by the different thermal expansion coefficients in the high capacity HDD.

SUMMARY OF THE INVENTION

The present general inventive concept provides a hard disk drive which can prevent a defect, for example, a rapid off track (ROP), due to mechanical deformation generated by different thermal expansion according to a temperature change in a VCM yoke and a base, being made of different materials.

Additional aspects and advantages of the present general inventive concept will be set forth in part in the description which follows and, in part, will be obvious from the description, or may be learned by practice of the general inventive concept.

The foregoing and/or other aspects of the general inventive concept may be achieved by providing a hard disk drive, the hard disk drive including a voice coil motor yoke in which a bobbin having a coil wound therearound, a base o support the voice coil motor yoke, and provided with a material different from that of the voice coil motor yoke, and a thermal deformation prevention unit formed of a material that is substantially the same as that of the voice coil motor yoke, provided between the voice coil motor yoke and the base, and preventing mechanical deformation due to different thermal expansion coefficients between the voice coil motor yoke and the base.

The thermal deformation prevention unit may be manufactured separate from the voice coil motor yoke, and the thermal deformation prevention plate may have the shape of a plate.

The base is provided with a recess groove portion, to be recessed from a major surface thereof to a predetermined depth along a thickness direction such that the thermal deformation prevention plate can be inserted in the recess groove portion and coupled to the base, and the thermal deformation prevention plate can form a part of the shape of the base. The hard disk drive may be reduced in size by use of an inner space of the base.

The thermal deformation prevention plate may be coupled to the base, and the voice coil motor yoke may be coupled to the thermal deformation prevention plate.

At least one first screw hole may be provided in the thermal deformation prevention plate and a first screw groove may be provided in the base to be recessed to a predetermined depth along a thickness direction at a position corresponding to the first screw hole such that at least one first screw passing through the first screw hole is coupled to the first screw groove.

The first screw may be formed of a material that is substantially the same as that of the thermal deformation prevention plate.

A head of the first screw may have a shape of a dish such that the head of the first screw does not protrude from an upper surface of the thermal deformation prevention plate. Thus, it is advantageous in the assembly of the thermal deformation prevention plate.

At least one second screw hole may be provided in the voice coil motor yoke and a second screw groove may be provided in the thermal deformation prevention plate to be recessed to a predetermined depth along a thickness direction at a position corresponding to the second screw hole such that at least one second screw passing through the second screw hole is coupled to the second screw groove.

The second screw groove may be formed to be recessed in the reinforcement portion that is formed on an upper surface of the thermal deformation prevention plate.

A head stack assembly having the bobbin may be coupled to the thermal deformation prevention plate.

A screw tab to which a pivot shaft of the head stack assembly is coupled may be provided on the thermal deformation prevention plate.

A first area of the thermal deformation prevention plate where the screw tab is provided may be stepped lower than a second area of the thermal deformation prevention plate.

A boundary wall separating the first area from the second area of the thermal deformation prevention plate may have a shape of an arc to correspond to the shape of one side surface of the head stack assembly.

The material of the base may be aluminum and the material of the voice coil motor yoke and the thermal deformation prevention plate may be stainless steel.

The foregoing and/or other aspects of the present general inventive concept may also be achieved by providing a hard disk drive including a voice coil motor yoke in which a bobbin having a coil wound therearound, a base to support the voice coil motor yoke, being made with a material different from that of the voice coil motor yoke, a recess groove portion formed to a predetermined depth along a thickness direction from a surface of the base, and a thermal deformation prevention unit inserted in the recess groove portion and coupled to each of the voice coil motor yoke and the base, to prevent mechanical deformation due to different thermal expansion coefficients between the voice coil motor yoke and the base.

The thermal deformation prevention unit may be manufactured separate from the voice coil motor yoke, and a thermal deformation prevention plate may have the shape of a plate.

The thermal deformation prevention plate may be coupled to the base, and the voice coil motor may be coupled to the thermal deformation prevention plate. Thus, it is advantageous to the reduction of the size of the hard disk drive by use of the inner space of the base.

The thermal deformation prevention plate may be inserted in the recess groove portion of the base to form part of the shape of the base.

The foregoing and/or other aspects of the present general inventive concept may also be achieved by providing a hard disk drive including a voice coil motor yoke of a head stack assembly having a read/write head and a bobbin having a coil wound therearound, a base to support the voice coil motor yoke made of a material different from that of the voice coil motor yoke, and a thermal deformation prevention unit coupled to each of the voice coil motor yoke, the head stack assembly, and the base to prevent mechanical deformation due to different thermal expansion coefficients between the voice coil motor yoke and the base.

The thermal deformation prevention unit may be manufactured separate from the voice coil motor yoke, and a thermal deformation prevention plate may have the shape of a plate.

The thermal deformation prevention plate may be coupled to the base and the voice coil motor and the head stack assembly may be coupled to the thermal deformation prevention plate.

The foregoing and/or other aspects of the present general inventive concept may also be achieved by providing a hard disk assembly, the assembly including a voice coil motor yoke, a base supporting the voice coil motor yoke, and a thermal deformation prevention unit coupled to the voice coil motor yoke and to the base, the material of the thermal deformation prevention unit being substantially similar to that of the voice motor coil yoke and substantially dissimilar to that of the base.

A microprocessor controlled memory system may be formed from the general inventive concept by including a microprocessor and a connector coupled to the microprocessor.

The foregoing and/or other aspects of the present general inventive concept may also be achieved by providing a hard disk drive, the hard disk drive including a voice coil motor yoke, a base to support the voice coil motor yoke, and a thermal deformation prevention unit made of a material different from a material of one of the voice coil motor yoke and the base, all disposed between the voice coil motor yoke and the base to prevent thermal deformation of at least one of the voice coil motor yoke and the base.

The foregoing and/or other aspects of the present general inventive concept may also be achieved by providing a hard disk drive, the hard disk drive including a voice coil motor yoke, a base, and a thermal deformation prevention unit disposed between the voice coil motor yoke and the base in a direction substantially parallel to a major surface of the base, to prevent thermal deformation of any one of the voice coil motor yoke and the base.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF THE PREFERRED EMBODIMENTS

Figure 1:
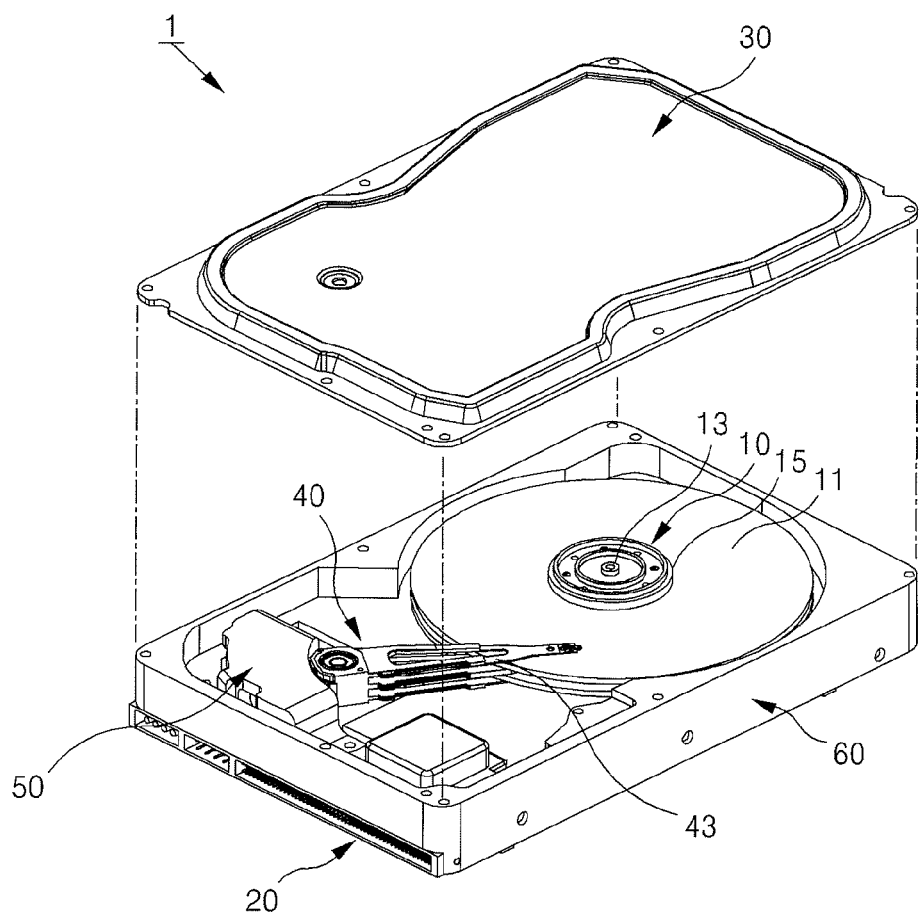
FIG. 1 is an exploded perspective view illustrating a hard disk drive according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
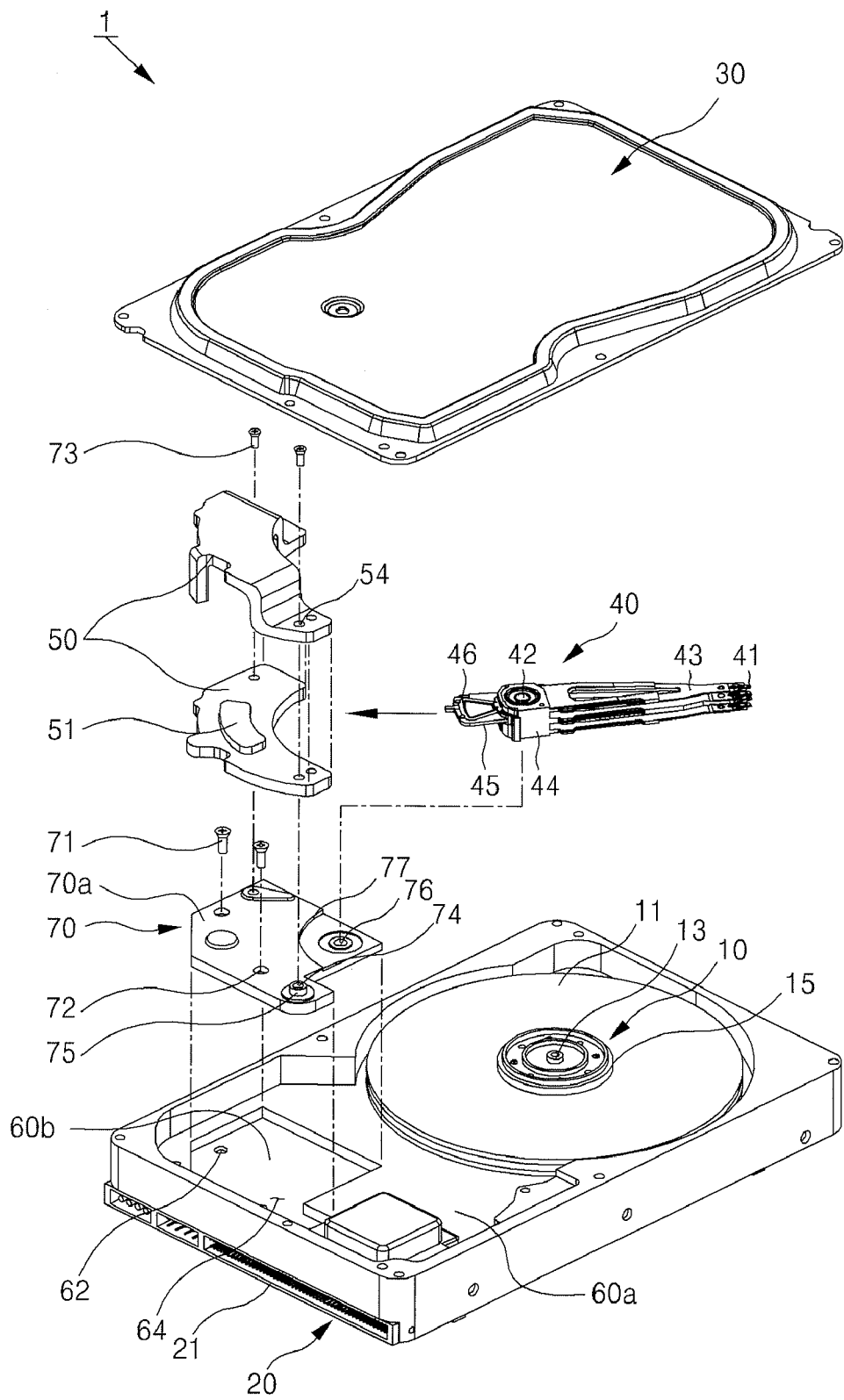
FIG. 2 is an exploded perspective view illustrating major parts of the hard disk drive of FIG. 1.
Figure 3:
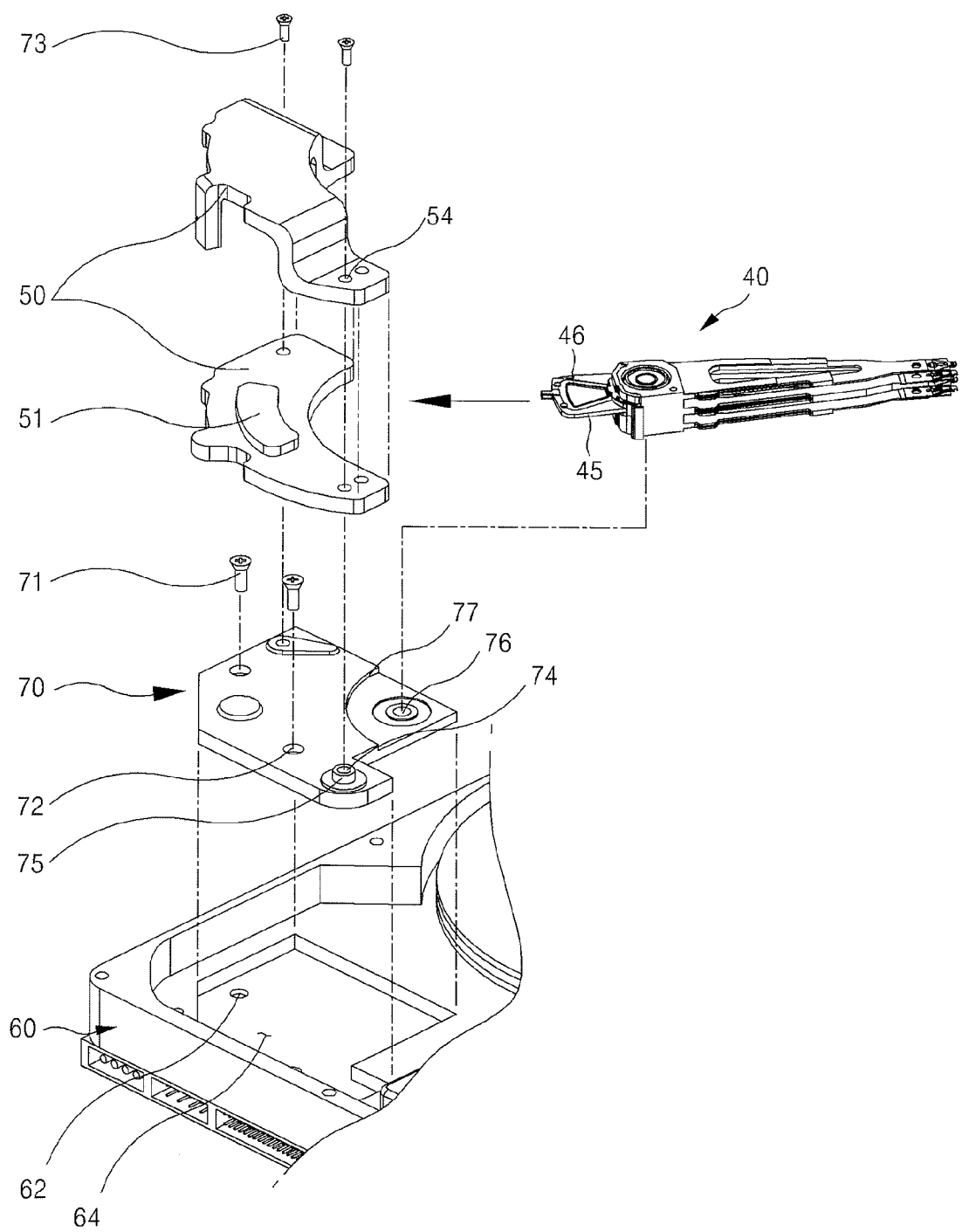
FIG. 3 is an enlarged exploded perspective view illustrating the major parts of FIG. 2.

FIG. 1 is an exploded perspective view illustrating a hard disk drive 1 according to an embodiment of the present general inventive concept. FIG. 2 is an exploded perspective view illustrating major parts of the hard disk drive 1 of FIG. 1. FIG. 3 is an enlarged exploded perspective view illustrating the major parts of FIG. 2. Referring to FIGS. 1, 2, and 3, the hard disk drive (HDD) 1 according to an embodiment of the present general inventive concept includes a disk pack 10, a printed circuit board assembly (PCBA) 20, a cover 30, a head stack assembly (HSA) 40, a VCM yoke 50 of a voice coil motor (VCM, not shown), a base 60, and a thermal deformation prevention unit 70 provided between the VCM yoke 50 of the VCM and the base 60 to prevent mechanical deformation by different thermal expansion coefficients of the VCM yoke 50 and the base 60.

The thermal deformation prevention unit 70 is manufactured of the same material as that of the VCM yoke 50 to offset different thermal expansion of the VCM yoke 50 and the base 60 so that the mechanical deformation and minute changes in relative dimensions generated by the thermal expansion according to the change of temperature are minimized.

The disk pack 10 includes a shaft 13 forming the center of rotation of a disk 11, a spindle motor hub (not shown) provided outside the shaft 13 in a radial direction and supporting the disk 11, a clamp 15 coupled to the upper portion of the spindle motor hub, and a clamp screw (not shown) pressing the clamp 15 to fix the disk 11 to the spindle motor hub.

The PCBA 20 includes a printed circuit board (PCB, not shown) having a board shape and a PCB connector 21 provided at one side of the PCB. A plurality of chips and circuits (not shown) are provided on the PCB to control the disk 11 and a read/write head 41 and communicate with external parts or devices or systems through the PCB connector 21.

The cover 30 covers the upper side of the base 60 and protects the disk 11 and the HSA 40. The HSA 40 operates as a carrier to record data on the disk 11 or to read out the recorded data and may include the read/write head 41, an actuator arm 43 pivoting over the disk 11 around a pivot shaft 42 so that the read/write head 41 can access the data on the disk 11, a suspension (not shown) coupled to an end portion of the actuator arm 43, a pivot shaft holder 44 to support the pivot shaft 42 capable of rotating, to which the actuator arm 43 is coupled and supported to the pivot shaft holder 44, and a bobbin 45 having a VCM coil 46 wound therearound and provided at the opposite side of the actuator arm 43 with respect to the pivot shaft holder 44 to be located between the VCM and a magnet 51.

The read/write head 41 is capable of reading or writing information from/to the rotating disk 11 by detecting a magnetic field formed on the surface of the disk 11 or magnetizing the surface of the disk 11. For the read and write of the data, the read/write head 41 may contain a write head to magnetize the disk 11 and a read head to detect the magnetic field of the disk 11.

The VCM operates similarly to that of a drive motor to allow the actuator arm 43 to pivot so as to move the read/write head 41 to a desired position on the disk 11 using the Fleming's left hand rule, that is, in principle, a force is generated when current flows in a conductive body existing in a magnetic field. The VCM may include the bobbin 45 provided at the rear end portion of the pivot shaft 42 of the HSA 40 which houses the read/write head 41, the VCM yoke 50 which may concentrate a distributed magnetic flux in a particular direction, the magnet 51 which is installed on the VCM yoke 50 and operates to generate a magnetic field, and the VCM coil 46 which is wound around the bobbin 45 and operates to receive a current from the magnetic field to generate an electromotive force. The VCM yoke 50 is generally made of stainless steel.

In the above exemplary inventive concept, as current is applied to the VCM coil 46 which is located between the magnets 51, a pivoting force is applied to the bobbin 45. Thus, the actuator arm 43 extending from the pivot shaft holder 44 in the opposite direction to the bobbin 45 pivots so that the read/write head 41 supported at the end portion of the actuator arm 43 moves across the disk 11 to search for a track and access the searched track so that the accessed information is signal processed.

The base 60 which is capable of operating as a frame includes the disk pack 10, the HSA 40, and the PCBA 20 which are assembled thereon. The base 60 is typically made of aluminum. A recess groove portion 64 is formed in the base 60 to a predetermined depth from a major surface 60a of the base 60 along the thickness direction thereof so that the thermal deformation prevention unit 70 which will be described later can be inserted. The recess groove portion 64 has a surface recessed from the major surface 60a by the predetermined depth. The recess groove portion 64 enables more efficient utilization of an inner space of the base 60 as an overall size of the HDD 1 is increased as the thermal deformation prevention unit 70 is provided between the VCM yoke 50 and the base 60, which will be described in detail later.

As described above, since the base 60 is formed of aluminum and the VCM yoke 50 is formed of stainless steel, the thermal expansion coefficients according to the change of temperature are different. That is, the thermal expansion coefficient of aluminum is greater than that of stainless steel. Additionally, the thermal expansion coefficient varies according to the type of stainless steel used, for example, 300 series stainless steel has a thermal expansion coefficient of 11~12 ($\times 10-6/°$ C.) and 400 series stainless steel has a thermal expansion coefficient of 17~18 ($\times 10-6/°$ C.). Aluminum has generally a thermal expansion coefficient of 23.6 ($\times 10-6/°$ C.). Thus, as the VCM yoke 50 and the base 60 have different thermal expansion coefficients, they thermally expand differently during changes of temperature. Accordingly, the above-described ROP (rapid off track) phenomenon may be generated. The ROP rapidly deteriorates accuracy in the read/write head 41 tracking so that the HDD 1 operates defectively, resulting in the reliability of the HDD 1 being diminished.

Thus, in the present general inventive concept, to offset the different thermal expansions occurring during the change of temperature in the different materials of the VCM yoke 50 and the base 60, the thermal deformation prevention unit 70 is provided between the VCM yoke 50 and the base 60. In the present embodiment, the thermal deformation prevention unit 70 may be a thermal deformation prevention plate having the shape of a plate. However, the present general inventive concept is not limited thereto and a variety of shapes can be adopted.

The thermal deformation prevention unit 70 may be formed of stainless steel that is substantially the same material as that of the VCM yoke 50. The material of the thermal deformation prevention unit 70 is not limited thereto. Also, the thermal deformation prevention unit 70 is coupled to the base 60 and the VCM yoke 50, so that the effect of the difference in thermal expansion between the base 60 and the VCM yoke 50 is minimized.

To couple the thermal deformation prevention unit 70 and the base 60, two first screw holes 72 are provided in the thermal deformation prevention unit 70 and two first screw grooves 62 are formed in the base, being recessed to a predetermined depth along the thickness direction at positions corresponding to the two first screw holes 72, so that two first screws 71 can be coupled by passing through the two first screw holes 72.

The first screw 71, which couples the thermal deformation prevention unit 70 and the base 60, may be formed of substantially the same material as that of the thermal deformation prevention unit 70 so that the mechanical deformation due to the thermal deformation can be minimized. The material of the first screw 71 is not limited thereto. The head of the first screw 71 is dish-shaped so that the head of the first screw 71 does not protrude from an upper surface 70a of the thermal deformation prevention unit 70. This prevents the head of the first screw 71 from interfering with the VCM yoke 50 which is arranged above the thermal deformation prevention unit 70, enabling the VCM yoke 50 to closely contact the thermal deformation prevention unit 70.

Next, in the coupling of the VCM yoke 50 which is arranged above the thermal deformation prevention unit 70, two second screw holes 54 are provided in the VCM yoke 50 and two second screw grooves 74 are formed in the thermal deformation prevention unit 70 to be recessed to a predetermined depth along the thickness direction at positions corresponding to the second screw holes 54, so that two second screws 73 passing through the two second screw holes 54 are coupled to the two second screw grooves 74. The second screw groove 74 is recessed in a reinforcement portion 75 formed on the upper surface of the VCM yoke 50 arranged above the thermal deformation prevention unit 70. The reinforcement portion 75 protrudes from a predetermined area of the surface of the thermal deformation prevention unit 70 and thereby reduces the different thermal expansion differences.

Unlike conventional approaches where a stainless steel HSA is coupled directly to an aluminum base, in the present general inventive concept, the HSA 40 is coupled to the thermal deformation prevention unit 70 which is formed of stainless steel. For this purpose, a screw tab 76 to which the pivot shaft 42 of the HSA 40 is coupled is provided on the thermal deformation prevention unit 70. According to conventional technology, since major parts of the HSA 40 are formed of stainless steel like the VCM yoke 50, a relative dimension change may be generated by the different thermal expansion coefficients of the HSA 40 and the base 60. However, as described in the general inventive concept, the HSA 40 is coupled to the thermal deformation prevention unit 70, so that a dimension change can be prevented.

A boundary wall 77 is provided that separates one area from an other area of the thermal deformation prevention unit 70 with respect to the screw tab 76. The boundary wall 77 has an arc-like shape to correspond to the shape of a surface of the HSA 40 which rotates with respect to the pivot shaft 42. This area of the thermal deformation prevention unit 70 is stepped to be lower than an other area thereof.

In the above-described general inventive concept, the lower surface of the thermal deformation prevention unit 70 and upper surface (or the surface 60b) of the base 60 are coupled to each other with the surfaces contacting each other. To prevent the reduction of the inner space of the base 60 or the increase of the size of the HSA 1, the thermal deformation prevention unit 70 is inserted in the recess groove portion 64 of the base 60. The thermal deformation prevention unit 70 is coupled to the base 60 by inserting the thermal deformation prevention unit 70 into the recess groove portion 64 of the base 60 and coupling the first screw 71 to the first screw hole 72 of the base 60 after passing the first screw 71 through the two first screw grooves 62 symmetrically formed and penetrating the thermal deformation prevention unit 70.

The first screw 71, which screw-couples the thermal deformation prevention unit 70 and the base 60, is formed of stainless steel. Also, since the head of the first screw 71 coupled to the thermal deformation prevention unit 70 and the base 60 has the dish-like shape, the upper surface of the thermal deformation prevention unit 70 and the lower surface of the VCM yoke 50 can closely contact each other so that the VCM yoke 50 can be coupled to the thermal deformation prevention unit 70 without a portion of the first screw 71 protruding above the upper surface 70a of the thermal deformation prevention unit 70.

The VCM yoke 50 is coupled to a surface of the thermal deformation prevention unit 70. As the second screws 73 pass through the second screw holes 54, formed at both sides of the VCM yoke 50, and are screw coupled to the second screw grooves 74, formed in the reinforcement portion 75, the VCM yoke 50 is coupled to the thermal deformation prevention unit 70.

Since the second screws 73 are formed of stainless steel, like the first screws 71, and are coupled to the thermal deformation prevention unit 70, rather than to the base 60, when the temperature of the base 60 is increased, the mechanical deformation due to the difference in thermal expansion between the base 60 and the VCM yoke 50 can be minimized. Thus, the defect related to the ROP phenomenon can be significantly reduced or even eliminated.

In addition, in the present embodiment, since the pivot shaft 42 of the HSA 40 is coupled to the screw tab 76 of the thermal deformation prevention unit 70, the HSA 40 is directly coupled to the thermal deformation prevention unit 70. Thus, the relative dimension change which is generated by the different thermal expansion coefficients of the HSA 40 and the base 60 can be minimized.

In the operation of the HDD 1 as configured above, when power is applied to the HDD 1 to start a recording and reproducing process, the disk 11 is rotated by the spindle motor. Accordingly, the actuator arm 43 moves the read/write head 41 to a predetermined position on the disk 11 so that the recording and reproducing process is performed.

When the HDD 1 starts to operate and as time passes during the operation of the HDD 1, the temperature of the HDD 1 increases so that parts of the HDD 1 thermally expand due to the increase of the surface temperature. The base 60 and the VCM yoke 50 exhibit different degrees of thermal expansion due to the different thermal expansion coefficients of the aluminum base 60 and the stainless steel VCM yoke 50. In conventional hard disk drives, when the thermal expansion continues, any deformation such as, for example, caused by an earthquake, may exceed the torque limit of the screw so that the ROP phenomenon occurs arising from the read/write head 41 momentarily deviating from the track which the head 41 is presently following.

However, in the present embodiment, unlike in conventional hard disk drives, since the thermal deformation prevention unit 70 is formed of the same material as that of the VCM yoke 50 and is arranged between the VCM yoke 50 and the base 60, and the thermal deformation prevention unit 70 and the base 60 are coupled using the stainless steel screws 71, and the VCM yoke 50 and the thermal deformation prevention unit 70 are coupled using the stainless steel screws 73, the mechanical deformation generated due to the difference in thermal expansion between the VCM yoke 50 and the base 60 can be minimized and additionally the ROP phenomenon can be prevented.

Furthermore, according to the present embodiments, since the HSA 40 is directly coupled to the thermal deformation prevention unit 70, the relative dimension change that can be generated by the different thermal expansion coefficients between the HSA 40 and the base 60 can be minimized.

In the above-described embodiments, although two screws are used for coupling of the thermal deformation prevention unit 70 and the base 60, and also for coupling the thermal deformation prevention unit 70 and the VCM yoke 50, the number of screws can be appropriately adjusted according to the design conditions.

According to the above-described embodiments of the present general inventive concept, a defect, for example, the ROP phenomenon, arising from a mechanical deformation between the VCM yoke 50 and the base due to their different thermal expansion, can be prevented. Thus, the reliability and quality of the HDD 1 can be improved.

It should be appreciated that the present general inventive concept may also be implemented in a micro-processor based system, such as, for example, a computer, a personal digital assistant, a (mobile) telephone, a camera, an MP3 player, etc., as according to design preference. Similarly, the performance of such system(s) may be enhanced by implementing an array of the present general inventive concept, so as to form a series, or parallel, or hybrid network of communicating devices/systems. Accordingly, it should be apparent that the general inventive concept can be hierarchically implemented either in an individual environment or within a network of systems that are coupled via a communication channel or signal.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A hard disk drive comprising:
a voice coil motor yoke in which a bobbin having a coil wound therearound is inserted;
a base to support the voice coil motor yoke, and provided with a material different from that of the voice coil motor yoke; and
a thermal deformation prevention plate formed of a material that is substantially the same as that of the voice coil motor yoke, provided between the voice coil motor yoke and the base, and preventing mechanical deformation from different thermal expansion coefficients between the voice coil motor yoke and the base; and
a head stack assembly having the bobbin and coupled to the thermal deformation prevention plate,
wherein the thermal deformation prevention plate comprises a screw tab, to which a pivot shaft of the head stack assembly is coupled.

2. The hard disk drive of claim 1, wherein:
the base comprises a recess groove portion having a shape to be recessed from a major surface of the base to a predetermined depth along a thickness direction such that the thermal deformation prevention plate is inserted in the recess groove portion and coupled to the base; and
the inserted thermal deformation prevention plate fills in the shape of the recess groove portion of the base.

3. The hard disk drive of claim 2, wherein the thermal deformation prevention plate is coupled to the base, and the voice coil motor yoke is coupled to the thermal deformation prevention plate.

4. The hard disk drive of claim 3, wherein the thermal deformation prevention plate comprises at least one first screw hole and the base comprises a first screw groove to be recessed to a predetermined depth along a thickness direction at a position corresponding to the first screw hole such that at least one first screw passing through the first screw hole is coupled to the first screw groove.

5. The hard disk drive of claim 4, wherein the first screw is formed of a material that is substantially the same as that of the thermal deformation prevention plate.

6. The hard disk drive of claim 4, wherein the first screw comprises a head having a shape of a dish such that the head of the first screw does not protrude from an upper surface of the thermal deformation prevention plate.

7. The hard disk drive of claim 3, wherein the voice coil motor yoke comprises at least one second screw hole and the thermal deformation prevention plate comprises a second screw groove to be recessed to a predetermined depth along a thickness direction at a position corresponding to the second screw hole such that at least one second screw passing through the second screw hole is coupled to the second screw groove.

8. The hard disk drive of claim 7, wherein the thermal deformation prevention plate comprises a reinforcement portion, and the second screw groove is recessed in the reinforcement portion of the thermal deformation prevention plate.

9. The hard disk drive of claim 1, wherein the thermal deformation prevention plate comprises a first area to be stepped lower than a second area of the thermal deformation prevention plate.

10. The hard disk drive of claim 9, wherein the thermal deformation prevention plate comprises a boundary wall to separate the first area from the second area of the thermal deformation prevention plate and to have a shape of an arc to correspond to a shape of one side surface of the head stack assembly.

11. The hard disk drive of claim 1, wherein a material of the base is aluminum and a material of the voice coil motor yoke and the thermal deformation prevention plate is stainless steel.

12. A hard disk drive comprising:
a voice coil motor yoke in which a bobbin having a coil wound therearound is inserted;
a base to support the voice coil motor yoke, and provided with a material different from that of the voice coil motor yoke, and having a recess groove portion having a shape formed to be recessed to a predetermined depth along a thickness direction from a surface of the base; and
a thermal deformation prevention unit inserted in the recess groove portion and coupled to the voice coil motor yoke via a first plurality of screws and separately coupled to the base via a second plurality of screws different than the first plurality of screws to prevent mechanical deformation due to different thermal expansion coefficients between the voice coil motor yoke and the base.

13. The hard disk drive of claim 12, wherein the thermal deformation prevention unit is manufactured separate from the voice coil motor yoke and is a thermal deformation prevention plate having a shape of a plate.

14. The hard disk drive of claim 12, wherein the thermal deformation prevention unit fills in the shape of the recess groove portion of the base.

15. A hard disk drive including a head stack assembly having a read/write head mounted thereon, the hard disk drive comprising:
 a voice coil motor yoke in which a bobbin having a coil wound therearound is inserted, the voice coil motor yoke comprising at least one screw hole;
 a base to support the voice coil motor yoke and provided with a material different from that of the voice coil motor yoke; and
 a thermal deformation prevention unit coupled to the voice coil motor yoke via a first screw, to the head stack assembly via a second screw, and to the base via a third screw to prevent mechanical deformation due to different thermal expansion coefficients between the voice coil motor yoke and the base,
 wherein the first screw does not connect to the base.

16. The hard disk drive of claim 15, wherein the thermal deformation prevention unit is manufactured separate from the voice coil motor yoke and is a thermal deformation prevention plate having the shape of a plate.

17. The hard disk drive of claim 16, wherein the thermal deformation prevention unit is coupled to the base, and the voice coil motor yoke and the head stack assembly are coupled to the thermal deformation prevention unit.

18. A hard disk drive assembly comprising:
 a head stack assembly (HSA);
 a voice coil motor yoke;
 a base to support the voice coil motor yoke, and
 a thermal deformation prevention unit coupled to the voice coil motor yoke and to the base, a material of the thermal deformation prevention unit being substantially similar to the voice motor coil yoke and substantially dissimilar to the base
 wherein the thermal deformation prevention unit comprises a first portion to correspond to a shape of the voice coil motor yoke and a second portion to correspond to a shape of a portion of the HSA.

19. The hard disk drive assembly of claim 18, wherein the thermal deformation prevention unit is placed in a recessed area of the base.

20. The hard disk drive assembly of claim 18, further comprising:
 a connector to be coupled to an external microprocessor to exchange data.

21. The hard disk drive assembly of claim 20, wherein the microprocessor is a central processing unit (CPU) and the hard disk drive and the microprocessor are housed in a device.

22. A hard disk drive comprising:
 a voice coil motor yoke;
 a base to support the voice coil motor yoke; and
 a thermal deformation prevention unit made of a material different from a material of the base, and disposed between the voice coil motor yoke and the base to prevent thermal deformation of at least one of the voice coil motor yoke and the base,
 wherein the thermal deformation prevention unit comprises a reinforcement portion disposed on a surface facing the voice coil motor yoke, and the voice coil motor yoke is coupled to the reinforcement portion of the thermal deformation prevention unit.

23. The hard disk drive of claim 22, wherein the thermal deformation prevention unit and the base are not a single monolithic body but separate bodies.

24. The hard disk drive of claim 22, wherein the thermal deformation prevention unit and the voice coil motor yoke are not a single monolithic body but separate bodies.

25. The hard disk drive of claim 22, wherein the voice coil motor yoke and the base comprise adjacent surfaces that are substantially parallel to each other and the thermal deformation prevention unit is disposed in a direction parallel to the surfaces.

26. The hard disk drive of claim 22, wherein the base comprises a recessed groove portion recessed from a major surface to a recessed surface by a depth, and the thermal deformation prevention unit is disposed inside the recessed grooved portion to fill in the recessed groove portion of the major surface of the base.

27. The hard disk drive of claim 22, wherein the voice coil motor yoke is coupled to the thermal deformation prevention unit and the thermal deformation prevention unit is coupled to the base.

28. The hard disk drive of claim 22, wherein the voice coil motor yoke is not directly coupled to the base.

* * * * *